(12) United States Patent
Zimmer et al.

(10) Patent No.: US 8,128,143 B2
(45) Date of Patent: Mar. 6, 2012

(54) INNER GARNISH ASSEMBLY

(75) Inventors: John Zimmer, Canton, MI (US);
Leonard Marshick, Bellville, MI (US);
Rod Bara, Rochester Hills, MI (US)

(73) Assignee: Cooper-Standard Automotive Inc., Novi, MI (US)

( * ) Notice: Subject to any disclaimer, the term of this patent is extended or adjusted under 35 U.S.C. 154(b) by 919 days.

(21) Appl. No.: 11/631,712

(22) PCT Filed: Nov. 18, 2005

(86) PCT No.: PCT/US2005/042159
§ 371 (c)(1),
(2), (4) Date: Apr. 30, 2008

(87) PCT Pub. No.: WO2006/055911
PCT Pub. Date: May 26, 2006

(65) Prior Publication Data
US 2008/0282617 A1 Nov. 20, 2008

Related U.S. Application Data

(60) Provisional application No. 60/628,986, filed on Nov. 18, 2004.

(51) Int. Cl.
*B60J 9/00* (2006.01)
(52) U.S. Cl. .................................................. 296/1.08
(58) Field of Classification Search ............... 296/1.08, 296/146.16; 49/500.1, 493.1, 490.1, 484.1
See application file for complete search history.

(56) References Cited

U.S. PATENT DOCUMENTS

| 4,614,061 | A | * | 9/1986 | Brocke ........................... 49/440 |
| 4,888,929 | A | | 12/1989 | Vaughan et al. |
| 4,951,418 | A | * | 8/1990 | Keys ............................... 49/440 |
| 4,969,294 | A | * | 11/1990 | Guillon et al. ............... 49/495.1 |
| 4,970,828 | A | * | 11/1990 | Mesnel et al. ................. 493/74 |
| 5,014,464 | A | * | 5/1991 | Dupuy et al. .................. 49/440 |
| 5,054,242 | A | * | 10/1991 | Keys et al. ................... 49/490.1 |
| 5,207,029 | A | * | 5/1993 | Nozaki et al. ................ 49/495.1 |
| 5,331,767 | A | * | 7/1994 | Takeuchi et al. ............. 49/490.1 |

(Continued)

FOREIGN PATENT DOCUMENTS

EP 0 573 139 A1 12/1993
(Continued)

OTHER PUBLICATIONS

EP 05 82 4812 Supplementary European Search Report, mailed Oct. 25, 2010.

*Primary Examiner* — Kiran B. Patel
(74) *Attorney, Agent, or Firm* — Fay Sharpe LLP

(57) ABSTRACT

A one-piece inner garnish assembly is provided for an associated vehicle window opening. The garnish assembly includes a weatherseal assembly and a garnish joined thereto prior to installation on the associated vehicle. In one embodiment, the weatherseal assembly includes first and second legs extending from a base portion. Each leg includes a low friction seal lip such as flock or TPV for sealingly engaging surface of the associate vehicle window. The garnish is a molded component that is joined to the weatherseal assembly, for example, in a preferred embodiment the garnish is joined to a leg of the weatherseal assembly. In another embodiment of the garnish assembly, a belt seal with integral garnish and molded transition members at opposite ends are provided.

16 Claims, 5 Drawing Sheets

U.S. PATENT DOCUMENTS

| | | | |
|---|---|---|---|
| 5,437,124 A * | 8/1995 | Ahlfeld et al. | 49/479.1 |
| 5,566,510 A * | 10/1996 | Hollingshead et al. | 49/479.1 |
| 5,582,895 A | 12/1996 | Dupuy et al. | |
| 5,651,217 A * | 7/1997 | Mesnel | 49/441 |
| 5,740,640 A * | 4/1998 | Yasuda | 52/204.597 |
| 5,779,956 A * | 7/1998 | Hollingshead et al. | 264/138 |
| 5,799,442 A * | 9/1998 | Takahashi et al. | 49/377 |
| 5,970,659 A * | 10/1999 | Oord | 49/377 |
| 6,007,140 A * | 12/1999 | Heitmann et al. | 296/146.9 |
| 6,038,930 A * | 3/2000 | Lehnen et al. | 73/774 |
| 6,082,048 A * | 7/2000 | Backes et al. | 49/377 |
| 6,138,338 A | 10/2000 | Berry | |
| 6,205,712 B1 * | 3/2001 | Ellis | 49/441 |
| 6,401,397 B2 * | 6/2002 | Klein et al. | 49/495.1 |
| 6,409,251 B1 * | 6/2002 | Kaye et al. | 296/146.9 |
| 6,485,663 B1 * | 11/2002 | Dover | 264/173.17 |
| 6,487,820 B1 * | 12/2002 | Nakajima et al. | 49/490.1 |
| 6,612,074 B1 * | 9/2003 | Kaye et al. | 49/441 |
| 6,652,952 B2 * | 11/2003 | Drozd et al. | 428/122 |
| 6,679,003 B2 * | 1/2004 | Nozaki et al. | 49/441 |
| 6,684,575 B2 * | 2/2004 | Oda et al. | 49/498.1 |
| 6,817,651 B2 * | 11/2004 | Carvalho et al. | 296/146.2 |
| 6,843,024 B2 * | 1/2005 | Nozaki et al. | 49/490.1 |
| 6,942,278 B2 * | 9/2005 | Shimizu | 296/146.9 |
| 6,996,936 B1 * | 2/2006 | Maass | 49/479.1 |
| 2005/0081450 A1 * | 4/2005 | Zwolinski et al. | 49/441 |
| 2006/0000181 A1 * | 1/2006 | Zwolinski et al. | 52/716.5 |
| 2006/0059799 A1 * | 3/2006 | Zimmer et al. | 52/204.1 |

FOREIGN PATENT DOCUMENTS

| | | |
|---|---|---|
| EP | 0 832 776 A1 | 4/1998 |
| JP | 2002 059493 | 2/2002 |

* cited by examiner

INNER GARNISH ASSEMBLY

This application is the national filing of International Application PCT/US2005/042159, international filing date 18 Nov. 2005, which claims priority of U.S. Provisional Application Ser. No. 60/628,986, filed on Nov. 18, 2004, the disclosures of which are incorporated herein by reference.

BACKGROUND OF THE INVENTION

There is an ever increasing need to remove cost associated with the assembly of vehicles, and particularly with respect to vehicle components. It is conventional to separately manufacture a glass seal assembly and an inner garnish that is provided on the inside of a vehicle door above a belt line. The glass seal assembly is mounted around the perimeter of the window opening of the door and provides a seal lip that sealingly engages the edge of the window along the pillar portions (A and B pillars, or B and C pillars). The garnish provides an aesthetic cover that masks or hides a paint stripe that would otherwise be evident around the window perimeter (sometimes referred to in the industry as a skunk stripe). Each of these components is separately manufactured and separately secured to the vehicle. That is, the glass seal assembly has always been made separate from the garnish thereby adding substantially to manufacture and assembly costs associated with these components.

The seal assembly extends around the perimeter of the window opening, i.e., the glass sealing lip extending along the pillars, header, and the belt seal. These components are usually extruded components secured to a door flange by a series of spaced fasteners or attachment clips. Manufacturers of these glass seal assemblies are one supply source to the OEMs, and these manufacturers have developed their own expertise in the technology.

Separate and apart from the glass seal assembly manufacturers, different manufacturers provide an inner garnish. For definitional purposes, the garnish is generally identified as an interior aesthetic component having a grain or color that may match the vehicle interior and covers around the door perimeter. The garnish is not designed to impact sound transmission; rather, it is simply an aesthetic structure having extended or wide cover lips that function to hide paint lines. The garnish provides an aesthetically pleasing transition, for example, between the door window opening and the interior of the door and vehicle. Whereas the seal assembly is typically an extruded structure, the garnish is usually a molded component such as an injection molded plastic component that is separately secured to the vehicle.

The OEM incurs labor costs associated with assembly of each component to the vehicle. That is, the seal assembly is separately clipped or fastened around the window opening in a manner well known in the art. Likewise, the garnish is attached to the vehicle via fasteners at spaced locations around the window opening.

SUMMARY OF THE INVENTION

A one-piece inner garnish assembly joins a sealing assembly to the garnish prior to installation of the inner garnish assembly on the vehicle.

The one-piece garnish assembly includes a weatherseal assembly including a base portion, and first and second legs extending outwardly from the base portion. Seal lips are provided on the legs for selective sealing engagement with the associated vehicle window. A garnish, including an attachment leg and a cover lip extending therefrom, is secured to the weatherseal assembly via the attachment leg operatively engaging one of the first and second legs of the weatherseal assembly portion.

The garnish assembly further includes an inner belt seal with an overlay garnish along the belt line. The inner belt seal/belt line garnish is attached at opposite ends to pillar portions of the garnish. The inner belt seal strip includes first and second legs extending from a base region and gripping opposite surfaces of a vehicle flange, and an integrally formed seal lip that extends outwardly for sealing engagement with an associated vehicle window. The belt line garnish is conformed for gripping receipt over the base region of the inner belt seal and includes an extending portion that covers a lower perimeter portion of the vehicle interior adjacent the belt line.

The garnish portion of the garnish assembly is preferably molded and secured to a clip that attaches the garnish assembly to an associated vehicle.

The garnish portion of the garnish assembly further includes a seal lip molded along an edge thereof for transitioning to the vehicle interior.

The garnish portion preferably includes molded corners for interconnecting the belt line garnish to the pillar portions of the garnish.

The garnish portion of the assembly may be color keyed to the vehicle interior and may include a grain finish for aesthetics.

The one-piece unitary structure results in a dramatic improvement, i.e., reduction, in cost. This cost savings is primarily associated with the reduction in assembly costs associated with separate components. That is, the OEM will realize a tremendous savings in plant labor costs by using the new structure.

There also is the added benefit of cost savings associated with a single source that supplies the inner garnish assembly.

Still another benefit relates to the interfit of the components that were previously separate components.

Yet another advantage is the ability to provide a one-piece structure that satisfies the design and engineering criteria associated with prior, individual components.

Still other benefits and advantages of the invention will become apparent to those skilled in the art upon reading and understanding the following detailed description.

DETAILED DESCRIPTION OF THE INVENTION

Figure 1:
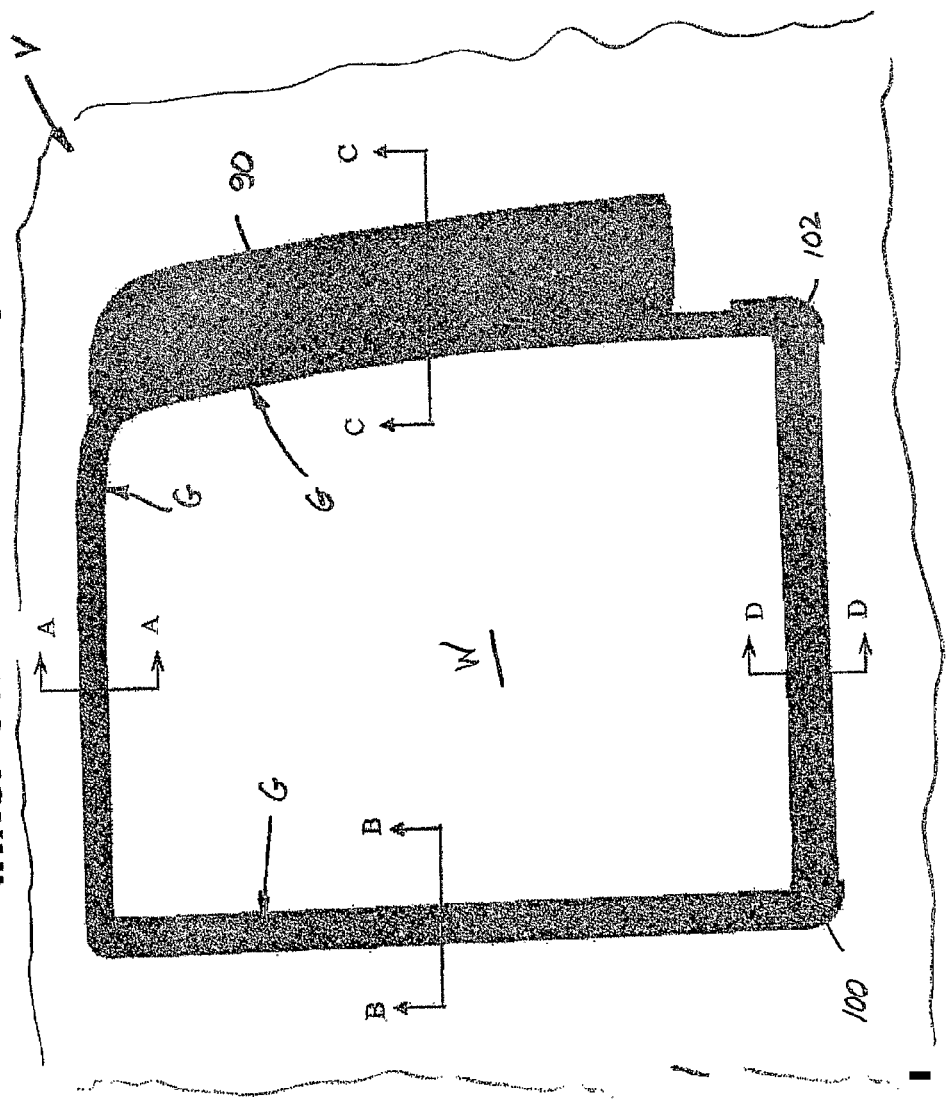
FIG. 1 is a plan view of an interior portion of a vehicle door around the window opening thereof.
Figure 2:
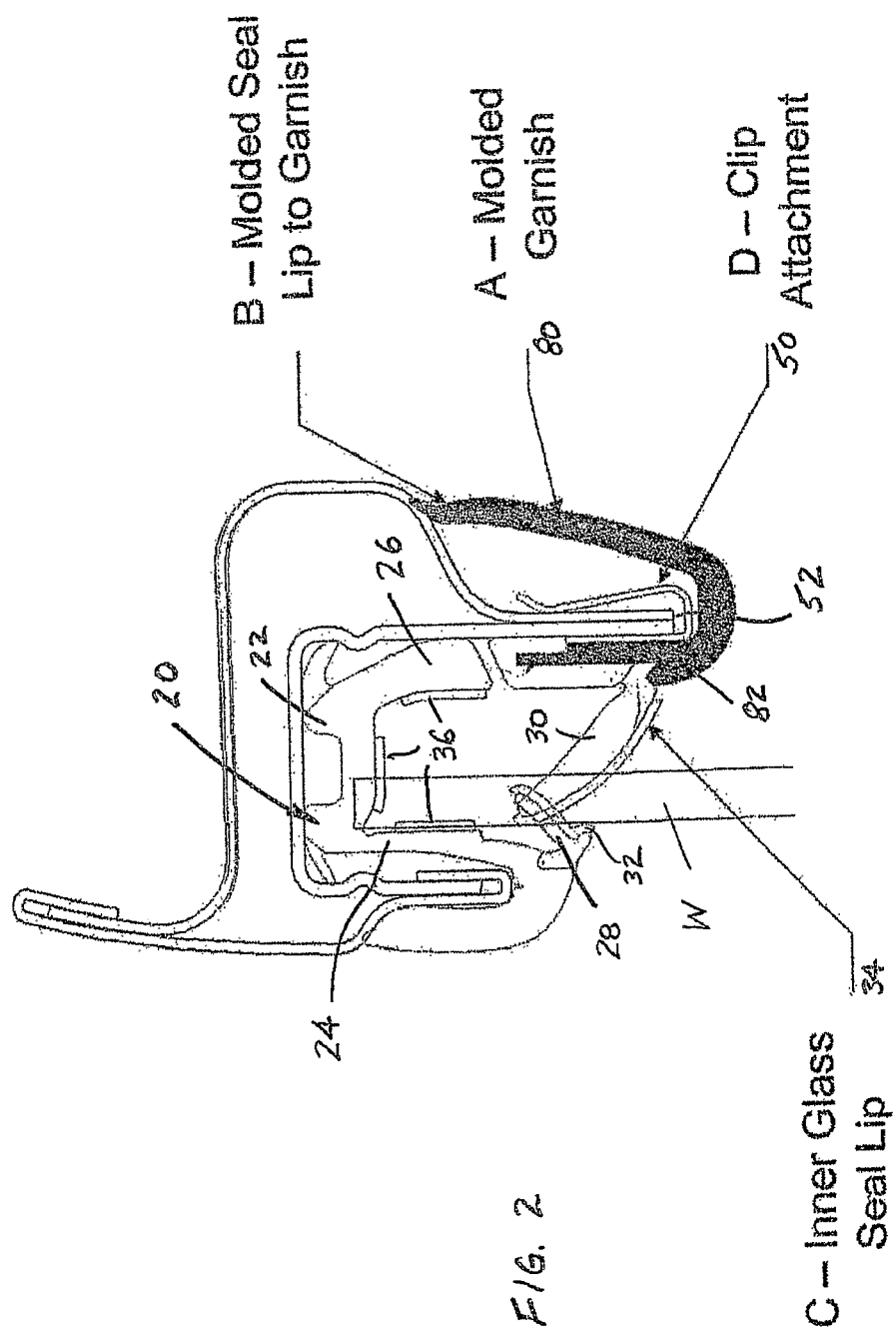
FIG. 2 is a cross-sectional view taken generally along the lines A-A of FIG. 1.
Figure 3:
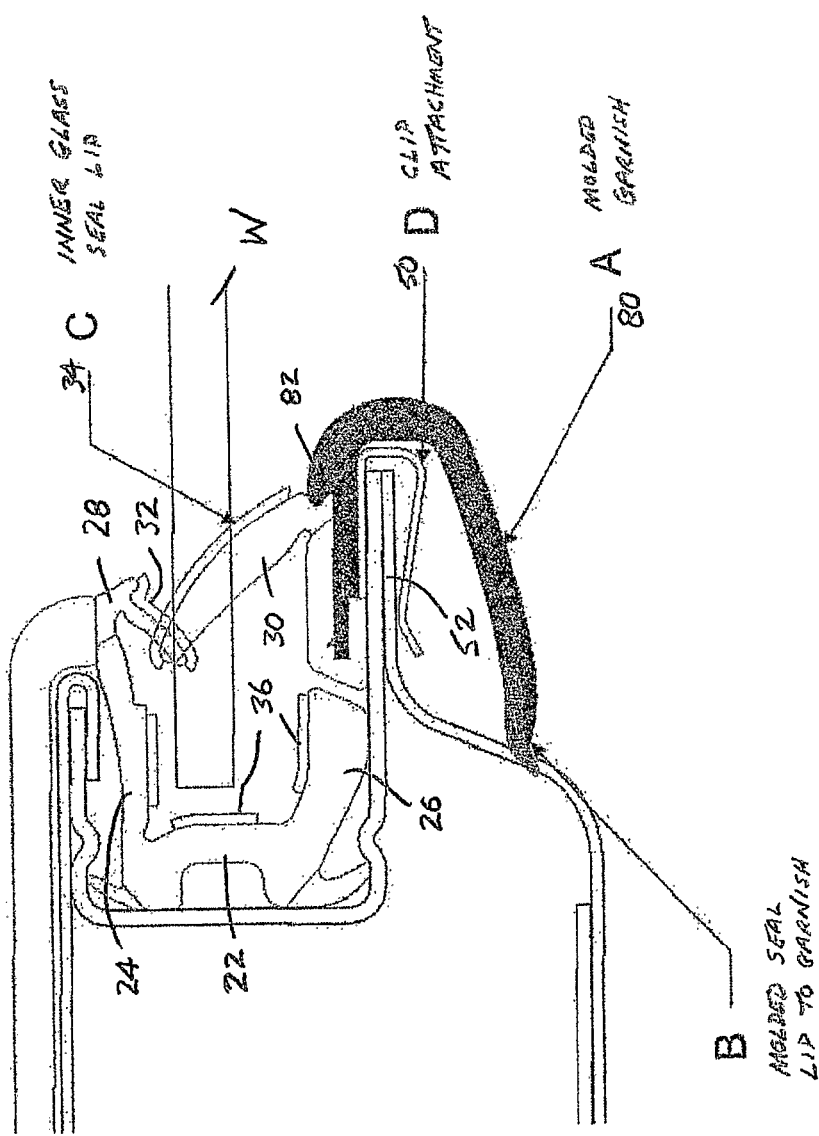
FIG. 3 is a cross-sectional view taken generally along the lines B-B of FIG. 1.
Figure 4:
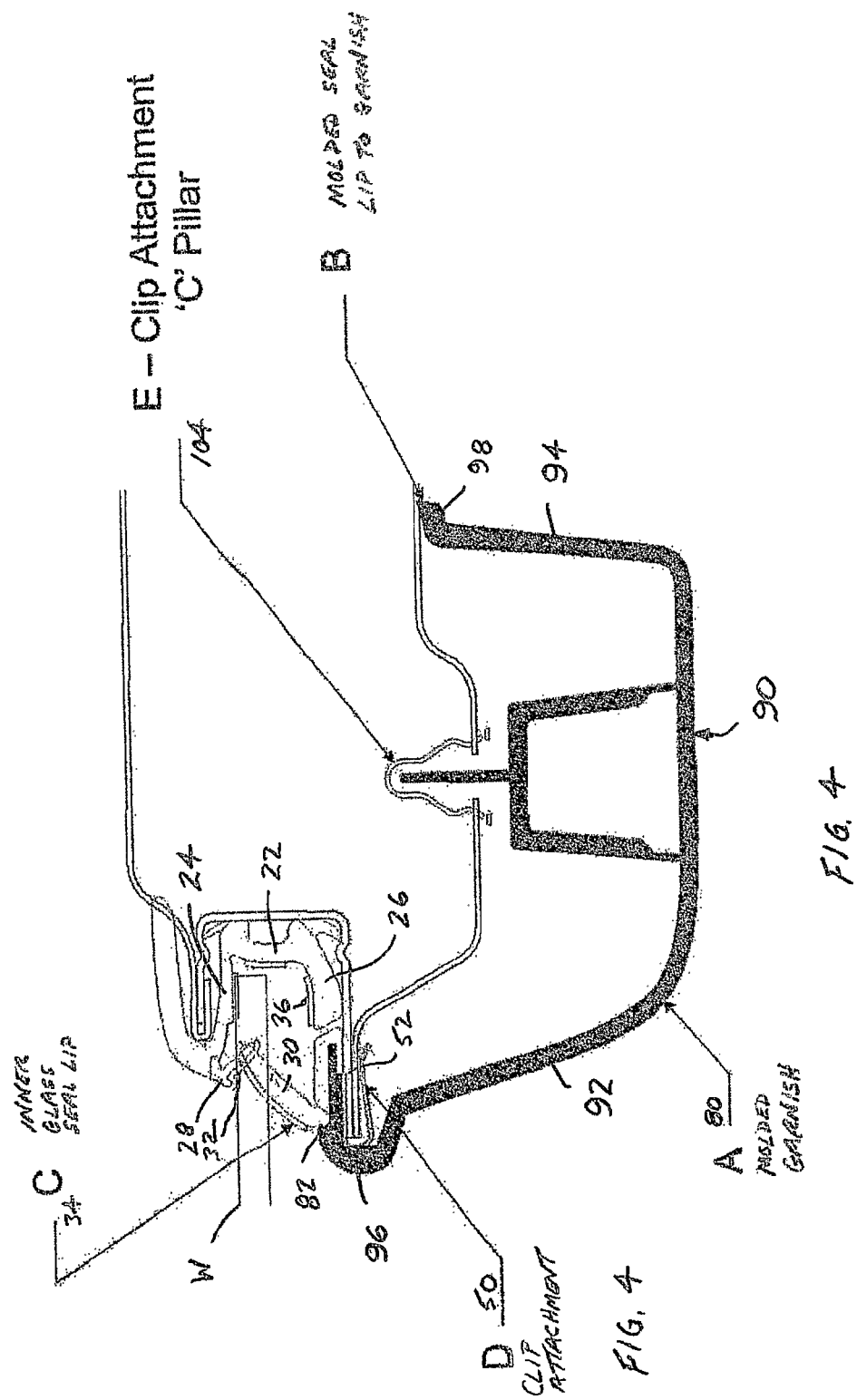
FIG. 4 is a cross-sectional view taken generally along the lines C-C of FIG. 1.
Figure 5:
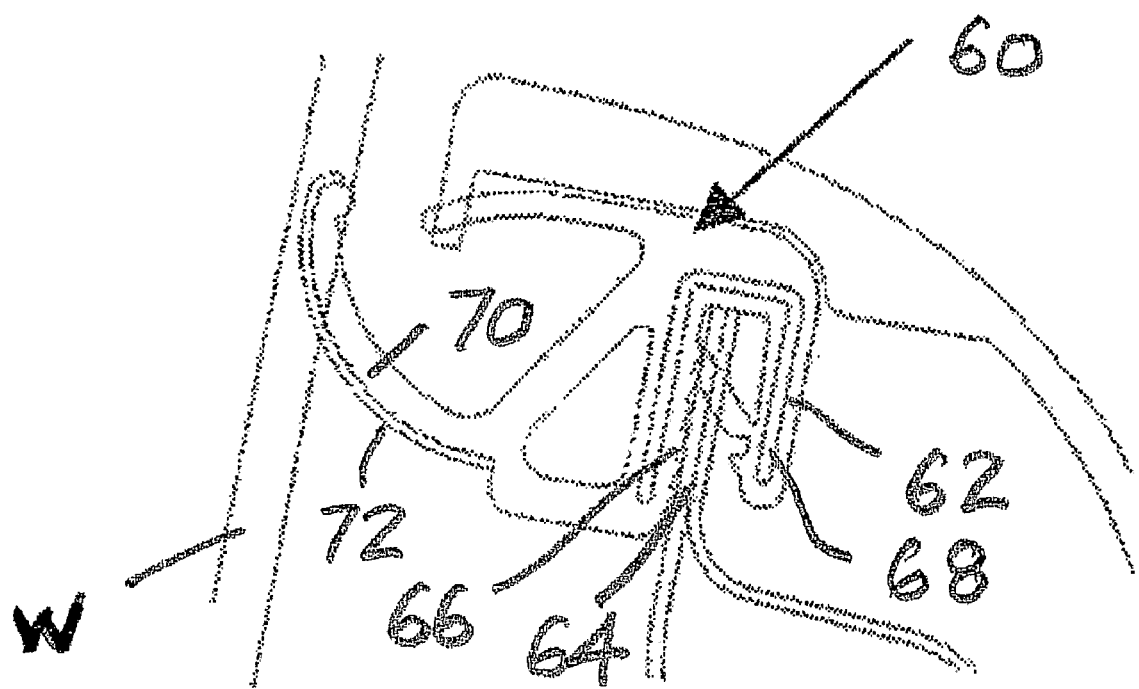
FIG. 5 is a cross-sectional view taken generally along the lines of D-D of FIG. 1.

Turning first to FIG. 1, a vehicle door V includes an opening that receives a window W. The window is selectively raised and lowered relative to the opening by a manual or powered regulator (not shown) in a conventional manner. About the perimeter of the window is provided a seal assembly or glass seal assembly, best illustrated in the cross-sectional views of FIGS. 2-5. For example, FIGS. 2-4 illustrate a generally U-shaped seal assembly or weatherseal 20 having a base portion 22 and outwardly extending legs 24, 26. Seal lips 28, 30 are provided at outer terminal ends of the seal assembly and may include a low-friction surface 32, 34, such as a flock or TPV (thermoplastic vulcanizate) coating, on the seal lips at regions thereof that engage the window. Similarly, a low-friction material 36 may be provided in selected regions of the base 22 and/or along interior portions of the first and second legs 24, 26 of the weatherseal assembly.

Along selected portions of the window perimeter, such as the A-pillar, B-pillar (or C-pillar), and along the header portion, the weatherseal assembly is secured to the vehicle with fasteners or attachment clips 50. The clips are preferably spaced along the pillar and header portions of the glass seal assembly. The clips are received around an associated flange portion 52 of the vehicle and effectively secure the weatherseal assembly to the vehicle. Along the belt line of the window opening is an inner belt seal assembly such as shown in cross-section in FIG. 5. The inner belt 60 includes an inverted, generally U-shaped portion 62 received over vehicle flange 64. The U-shaped portion preferably includes one or more gripping fins 66 extending inwardly into an internal cavity thereof to tightly engage the flange. A rigid reinforcing member 68 is typically incorporated into the extruded inner belt and a seal lip 70 extends outwardly for selective sealing engagement with the window. As will be appreciated, the seal lip may include a low-friction surface 72 such as a flock or TPV material to reduction friction between the seal lip and the window surface.

As noted in the Background, along the perimeter of the door opening and disposed on an interior of the vehicle is a garnish G, shown in FIGS. 1-4 as extending along the pillar portions, as well as the interconnecting header portion. The garnish G is a molded component that provides an aesthetically pleasing surface along these regions of the window opening. The garnish typically has a wide or extended lip 80 that hides a paint line and/or serves as an aesthetic cover along the interior perimeter of the window opening. In accordance with the present invention, the garnish includes a leg 82 extending from the cover lip that is joined to (e.g. molded to) the one of the legs of the glass seal assembly (shown here as leg 26 in FIG. 2). The garnish 80 is molded, and the seal lip 30 is then molded to form the glass seal lip 34. These components (80, 82, 30, 34) could be molded together or alternatively separately molded and laced or snapped together to form a one-piece component. As a result, the prior art arrangement of a separate garnish, separate appliqué, and separate belt, is now replaced by a glass run with garnish that includes the molded garnish, molded seal lip to garnish and the inner glass seal lip along with the inner belt. As will be appreciated, all of these separate components of the prior art required separate assembly while the one-piece arrangement, adding to the total labor cost associated with the vehicle. In this manner, the garnish G provides a smooth aesthetic surface that is secured to the glass seal assembly and secured by the same set of fasteners or attachment clips 50. Thus, this joined assembly, referred to herein as an inner garnish assembly, now integrally or unitarily joins the heretofore separate components of a garnish and glass seal assembly as a one-piece member.

In some arrangements, an additional pillar garnish 90 is provided. It will be appreciated that the pillar garnish is not required in all vehicle arrangements; however, incorporation of the pillar garnish into this assembly is best understood by a review of FIGS. 1 and 4. The pillar garnish 90 is a substantially enlarged molded component that extends outwardly from the vehicle along leg portions 92, 94. Leg 92 transitions at terminal end 96 into engagement with the glass seal assembly. Likewise, transition portion 98 is provided along the second leg 94 to form a seal lip that merges with the vehicle interior.

With reference again to FIG. 1, molded transition members 100, 102 interconnect the inner belt to the ends of the garnish assembly. These transition members provide a smooth interface and further interlock the inner garnish assembly together so that it can be conveniently mounted as a single unit (i.e., with the inner belt) to the vehicle.

As briefly noted above, the garnish may be keyed to preferred interior colors of the vehicle. In addition, the inner garnish assembly may be provided with or without the pillar garnish member 90, but if incorporating the pillar garnish, the additional component is again provided as a part of the one-piece assembly. The pillar garnish is preferably integrally molded with the remainder of the garnish, which is then attached to the vehicle with the clips.

A number of clips may be provided around the assembly. In one preferred arrangement, for example, three attachment clips are provided in the header portion, three additional spaced clips along the B pillar, and three addition clips along the C pillar. However, the number and location of the clips may vary as will be appreciated by one skilled in the art. Still further, additional clips 104 (FIG. 6) are molded at spaced regions along the pillar garnish and at roughly ninety degrees (90°) thereto for further securing the assembly to the vehicle.

The present invention has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A one-piece inner garnish assembly for a window opening of an associated vehicle comprising:
    a weatherseal assembly secured to the associated vehicle along header and pillar portions of the window opening, the weatherseal assembly including:
        a base portion,
        first and second legs extending from the base portion, and
        first and second seal lips extending from the legs for selectively engaging opposite surfaces of an associated vehicle window; and,
    an inner garnish secured to the weatherseal assembly to form a one-piece assembly for mounting on an associated vehicle, the garnish including:
        a cover lip, and
        a leg extending from the cover lip that is joined to the weatherseal assembly.

2. The invention of claim 1, wherein the garnish leg is attached to at least one of the first and second legs of the weatherseal assembly.

3. The invention of claim 1, wherein the leg of the garnish leg is integrally joined with at least one of the first and second legs of the weatherseal assembly.

4. The invention of claim 1, further comprising an attachment clip for securing the garnish assembly to an associated vehicle.

5. The invention of claim 4, wherein the pillar garnish includes an additional clip for attaching garnish assembly to an interior of the associated vehicle.

6. The invention of claim 1, wherein the garnish further includes a seal lip extending from the cover lip.

7. The invention of claim 6, wherein the seal lip is integrally formed with the cover lip.

8. The invention of claim 1, further comprising an inner belt seal assembly.

9. The invention of claim 8, further comprising at least one transition member for interconnecting an end portion of the inner belt seal assembly to an end portion of the garnish.

10. An inner garnish assembly for a window opening of an associated vehicle comprising:

a weatherseal assembly secured to the associated vehicle along at least a header and pillar portion, including a channel and an unsupported seal received therein having a base portion, and first and second legs extending from the base portion, each leg having a seal portion adapted to sealingly engage an associated vehicle window ; and, an inner garnish integrally joined as one-piece to a portion of the weatherseal assembly prior to assembly on an interior of the associated vehicle adjacent a portion of the window opening.

11. The invention of claim 10, wherein the base portion and first and second outwardly extending legs are extruded as a single component.

12. The invention of claim 10, wherein the garnish includes a cover lip and a leg extending from the cover lip.

13. The invention of claim 12, wherein the leg of the garnish is fixedly secured to at least one of the first and second legs of the weatherseal assembly.

14. The invention of claim 13, wherein the leg of the garnish is unitary with at least one of the first and second legs of the weatherseal assembly.

15. The invention of claim 10, further comprising an inner belt seal assembly secured to a portion of the window opening.

16. The invention of claim 15, further comprising at least one transition member for interconnecting an end portion of the inner belt seal assembly to an end portion of the garnish.

* * * * *